(12) United States Patent
Gupta et al.

(10) Patent No.: US 8,355,319 B2
(45) Date of Patent: Jan. 15, 2013

(54) MULTICAST DUAL JOIN FOR RING NETWORK TOPOLOGIES

(75) Inventors: Anubhav Gupta, Fremont, CA (US); Veluchamy Dinakaran, Sunnyvale, CA (US); Avoy Nanda, Milpitas, CA (US); Avinash Sridharan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 190 days.

(21) Appl. No.: 13/019,836

(22) Filed: Feb. 2, 2011

(65) Prior Publication Data

US 2012/0195311 A1     Aug. 2, 2012

(51) Int. Cl.
H04L 12/26    (2006.01)
H04H 20/71    (2008.01)
H04L 12/28    (2006.01)
H04J 3/26     (2006.01)

(52) U.S. Cl. ........ 370/222; 370/225; 370/312; 370/390; 370/432

(58) Field of Classification Search ........................ None
See application file for complete search history.

(56) References Cited

U.S. PATENT DOCUMENTS

| | | | | |
|---|---|---|---|---|
| 7,545,735 B1 * | 6/2009 | Shabtay et al. | ............... | 370/217 |
| 7,684,316 B2 * | 3/2010 | Filsfils et al. | ................. | 370/222 |
| 8,169,895 B2 * | 5/2012 | Takase et al. | ................. | 370/222 |
| 8,248,921 B2 * | 8/2012 | Yuan et al. | ..................... | 370/222 |
| 2004/0179471 A1 * | 9/2004 | Mekkittikul et al. | ......... | 370/218 |
| 2007/0121486 A1 * | 5/2007 | Guichard et al. | ............. | 370/216 |
| 2007/0242604 A1 * | 10/2007 | Takase et al. | ................. | 370/223 |
| 2008/0031130 A1 * | 2/2008 | Raj et al. | ....................... | 370/225 |
| 2009/0010257 A1 * | 1/2009 | Chaudhry et al. | ............. | 370/390 |
| 2009/0201803 A1 * | 8/2009 | Filsfils et al. | ................. | 370/222 |
| 2010/0271935 A1 * | 10/2010 | Allasia et al. | ................. | 370/222 |
| 2011/0249551 A1 * | 10/2011 | Rollins | ......................... | 370/222 |

OTHER PUBLICATIONS

Karan C. et al. "Multicast only Fast Re-Route; draft-karan-mofrr-00.txt", Multicast Only Fast Re-Route; DRAFT-KARAN-MOFRR-00.TXT, Internet Engineering Task Force, IETF; Standard Working Draft, Internet Society (ISOC) 4, Rue Des Falaises CH-1205 Geneva, Switzerland, Mar. 2, 2009.

* cited by examiner

Primary Examiner — Hassan Phillips
Assistant Examiner — Hicham Foud

(57) ABSTRACT

A network node includes a primary incoming interface, a secondary incoming interface and a data flow control unit. The primary incoming interface is operable to receive traffic associated with a particular source and multicast group. The secondary incoming interface is operable to serve as a backup interface if the primary incoming interface or a transmission path coupled to the primary incoming interface is inoperative. The data flow control unit is operable to determine whether the network node is part of a ring topology and if so, forward traffic received on the primary incoming interface associated with the source and multicast group to both a host which joined the multicast group and the secondary incoming interface and forward traffic received on the secondary incoming interface associated with the source and multicast group to the primary incoming interface.

23 Claims, 5 Drawing Sheets

MULTICAST DUAL JOIN FOR RING NETWORK TOPOLOGIES

BACKGROUND

In multicast operation, multicast packets associated with a particular multicast group, from a particular source, enter a router at a specific ingress interface. Conventional multicast forwarding mechanisms constrain the forwarding of the multicast packets destined to the same group, from the same destination, on the incoming interface. As such, under normal operating conditions for a given source and group, packets never exit on the ingress interface.

For example, IPTV (Internet Protocol television) uses multicast routing and forwarding technologies to carry video traffic from servers to set-top boxes (STBs) which connect to a TV. It is difficult for service providers to avoid any delay in screen refresh or minimize traffic loss due to any topology change or network down events. PIM (Protocol Independent Multicast) Dual Join is a functionality that enables a multicast network to minimize traffic loss in the event of an inoperative link on the path through which the multicast traffic is being received. This technology draws multicast data for a specific (S, G) route from multiple upstream interfaces. One of these two interfaces is typically referred to as the primary interface and the other interface is typically referred to as the secondary interface.

When the primary path fails, traffic received on the secondary path is used to serve interested hosts. However, conventional implementations of the PIM Dual Join mechanism are limited to star and square network topologies even though ring topologies are one of the most widely deployed topologies. If the conventional PIM Dual Join technology is used on a ring topology, then the functionality to serve hosts with multicast traffic from the secondary path when the primary path fails is not achieved. Indeed, the MoFRR (Multicast only Fast ReRoute) draft put forth by the IETF (Internet Engineering Task Force) that specifies fast re-route functionality for multicast traffic does not include support for ring topologies. As such, the secondary interface conventionally does not receive multicast traffic for ring topologies. When the primary interface goes down, multicast traffic is therefore lost to all hosts and downstream routers until the route is converged and traffic flow resumed via a newly established routing tree based on the PIM (Protocol-Independent Multicast) protocol. This delay is not acceptable for many types of applications including IPTV.

SUMMARY

The PIM Dual Join mechanism is implemented for a network node which is part of a ring topology according to the embodiments described herein. The network node includes a primary incoming interface which receives traffic associated with a particular source and multicast group and a secondary incoming interface which serves as a backup interface if the primary incoming interface or a transmission path coupled to the primary incoming interface is inoperative. When the PIM Dual Join mechanism described herein is enabled, traffic entering the node from the secondary incoming interface is sent out on the primary incoming interface. In addition, the traffic received on the secondary incoming interface is forwarded to a host which joined the multicast group when the primary incoming interface or a transmission path coupled to the primary incoming interface is inoperative. As such, the PIM Dual Join feature is available even when customers are connected to access routers which are part of a ring topology.

According to an embodiment of a network node for deployment in a packet-switched network, the network node includes a primary incoming interface, a secondary incoming interface and a data flow control unit. The primary incoming interface is operable to receive traffic associated with a particular source and multicast group. The secondary incoming interface is operable to serve as a backup interface if the primary incoming interface or a transmission path coupled to the primary incoming interface is inoperative. The data flow control unit is operable to determine whether the network node is part of a ring topology and if so, forward traffic received on the primary incoming interface associated with the source and multicast group to both a host which joined the multicast group and the secondary incoming interface and forward traffic received on the secondary incoming interface associated with the source and multicast group to the primary incoming interface. The data flow control unit can be further operable to determine if the primary incoming interface or a transmission path coupled to the primary incoming interface is inoperative when the network node is part of a ring topology, and if so forward the traffic received on the secondary incoming interface to the host.

According to an embodiment of a method of operating a network node deployed in a packet-switched network, the method includes receiving traffic associated with a particular source and multicast group on a primary incoming interface of the network node and using a secondary incoming interface of the network node as a backup interface if the primary incoming interface or a transmission path coupled to the primary incoming interface is inoperative. The method further includes determining whether the network node is part of a ring topology and if so, forwarding traffic received on the primary incoming interface associated with the source and multicast group to both a host which joined the multicast group and the secondary incoming interface and forwarding traffic received on the secondary incoming interface associated with the source and multicast group to the primary incoming interface. The method can further include determining whether the primary incoming interface or a transmission path coupled to the primary incoming interface is inoperative when the network node is part of a ring topology, and if so forward the traffic received on the secondary incoming interface to the host.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
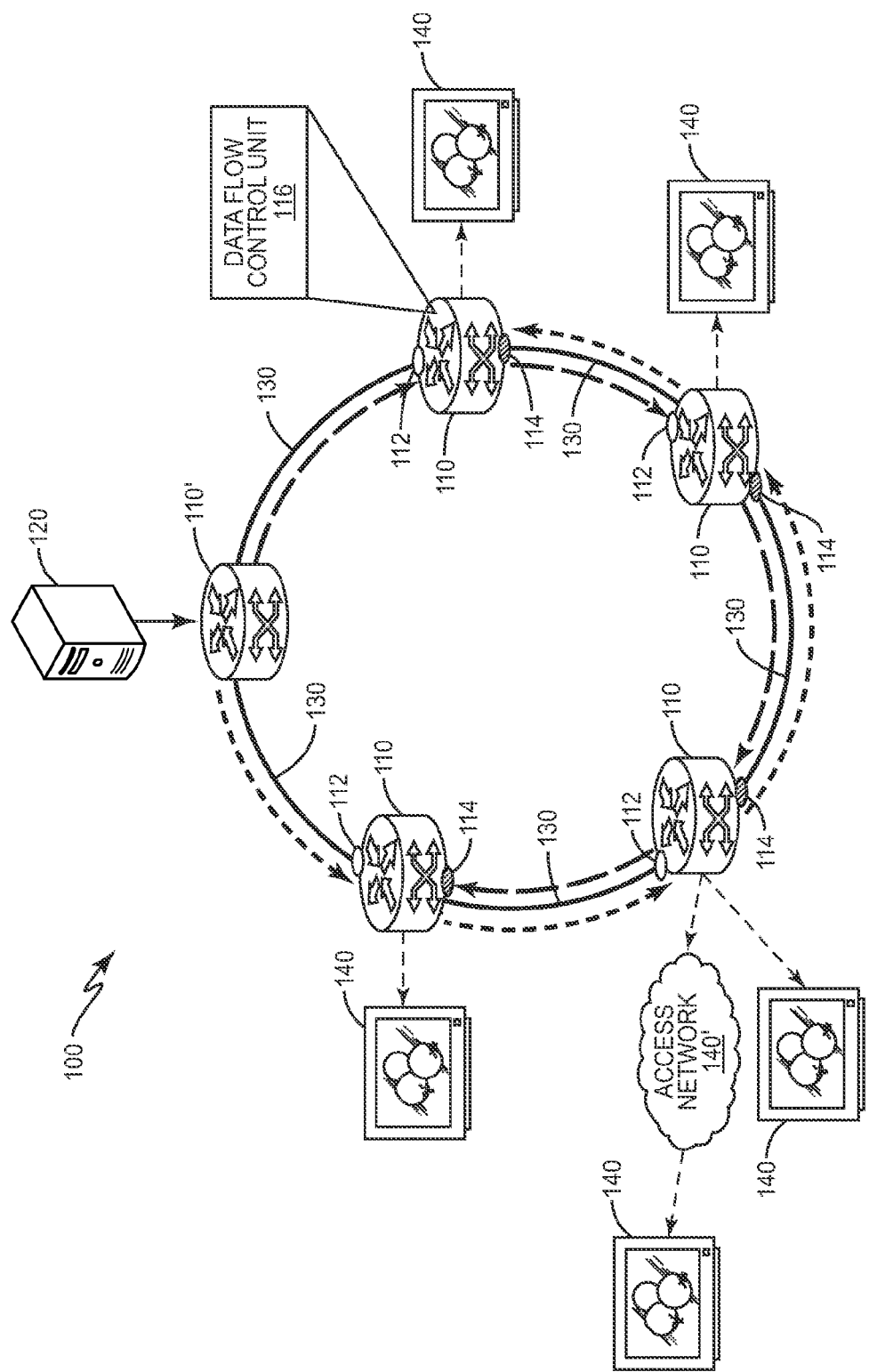
FIG. 1 is a block diagram of an embodiment of a packet-switched network configured in a ring topology with multicast traffic.

FIG. 1 illustrates an embodiment of a packet-switched network 100 including a plurality of network nodes 110 with one of the network nodes 110' connected to a source 120 which makes content available to other devices. In some embodiments, the network nodes 110 are routers configured in a ring topology with neighboring nodes connected via a corresponding link 130 as shown in FIG. 1. Traffic can flow in both directions over each link 130. The network nodes 110 include a primary incoming interface (IIF) 112 which receives traffic associated with the source and a particular multicast group and a secondary IIF 114 which serves as a backup interface if the primary IIF 112 or a transmission path coupled to the primary IIF 112 is inoperative. Hosts 140 can join the multicast group to receive content from the source 120. A host 140 may be a device directly connected to one of the network nodes 110 or an access network 140' coupled to one of the network nodes 110 which facilitates the delivery of the content to one or more other host devices 140. In each case, content delivery to the hosts 140 is facilitated by propagating traffic over the ring topology of the packet-switched network 100. Multicast traffic flow in one direction is indicated by the inner dashed lines shown in FIG. 1 and multicast traffic flow in the other direction is indicated by the outer dashed lines shown in FIG. 1.

The network nodes 110 also include a data flow control unit 116 for managing the IIFs 112, 114 and traffic flow within the corresponding network node 110. The data flow control unit 116 determines whether the network node 110 is part of a ring topology and if so, forwards traffic received on the primary IIF 112 associated with a particular source and multicast group to both a host 140 which joined the multicast group and the secondary IIF 114 of the node 110. The data flow control unit 160 also forwards traffic received on the secondary IIF 114 associated with the same source and multicast group to the primary IIF 112 of the network node 110 when the node 110 is part of a ring topology. Otherwise, the data flow control unit 116 drops traffic received on the secondary IIF 114 when the network node 110 is not part of a ring topology and therefore does not forward the traffic received on the secondary IIF 114 to other network nodes 110. If the primary IIF 112 or a transmission path 130 coupled to the primary IIF 112 is inoperative when the network node 110 is part of a ring topology, the data flow control unit 116 forwards the traffic received on the secondary IIF 114 to a host 140 connected to the node 110 to ensure content delivery. By providing these functions, the data flow control unit 116 implements the PIM Dual Join mechanism for a network node 110 which is part of a ring topology.

Figure 2:
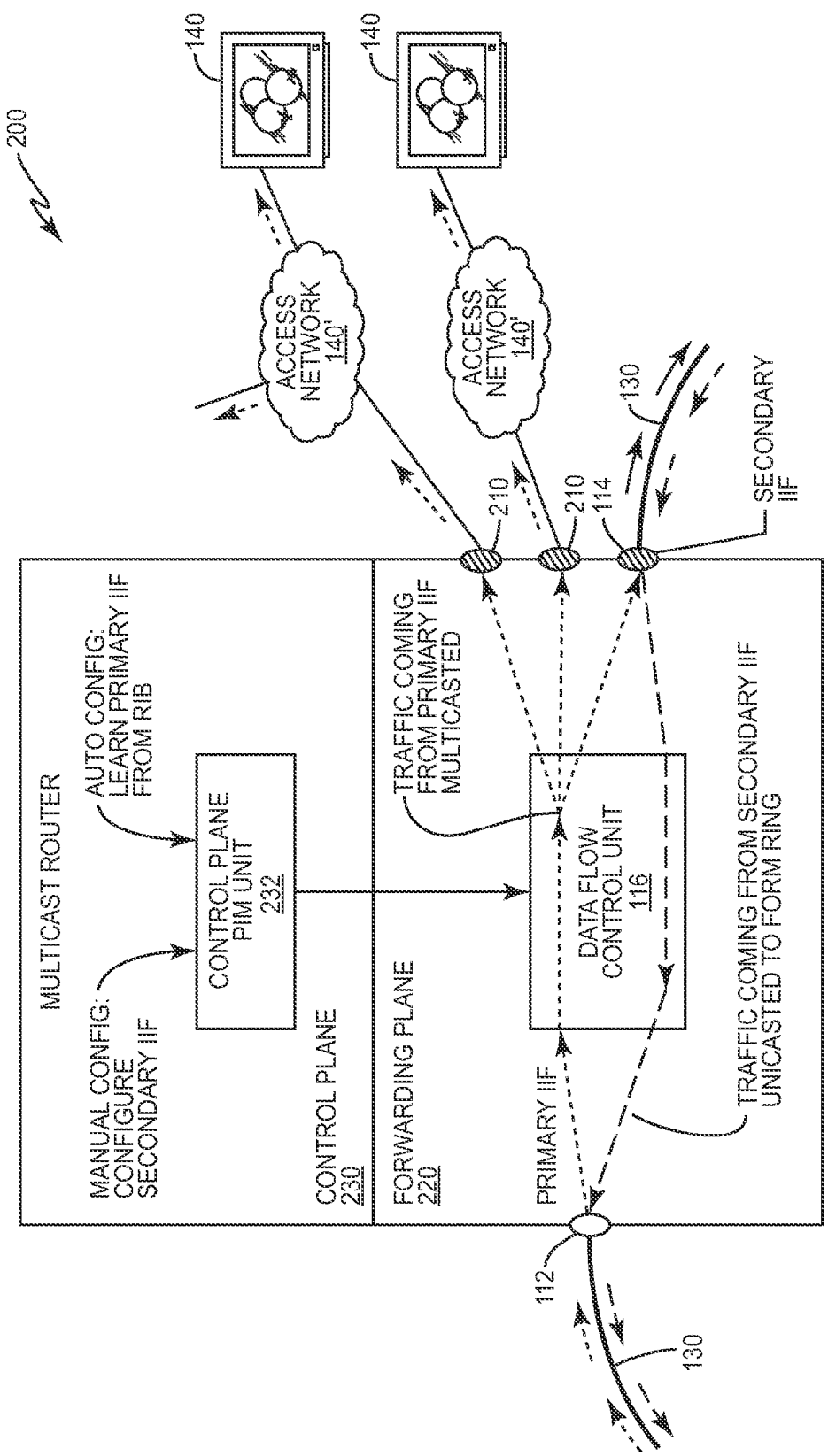
FIG. 2 illustrates an embodiment of a network node included in the packet-switched network of FIG. 1.

FIG. 2 illustrates one of the network nodes 110 in more detail. The network node 110 is a multicast router 200 which forms part of a ring topology according to this embodiment. The arrival of multicast traffic creates (S,G) entries or states in the router 200. Multicast traffic can be received on both primary and secondary interfaces. Traffic which is associated with a particular source and multicast group is received on the corresponding primary IIF 112 and multicast by the data flow control unit 116 to all hosts 140 which joined the multicast group e.g. on respective outgoing interfaces 210. The data flow control unit 116 also multicasts the traffic received on the primary IIF 112 to downstream (toward a host) routers on the secondary IIF 114. In addition, related traffic received on the secondary IIF 114 is unicast by the data flow control unit 116 to upstream (toward the source) routers on the primary IIF 112 so that the ring is complete in both directions. These functions implemented by the data flow control unit 116 form part of a forwarding plane 220 of the router 200.

The router 200 also has a control plane 230 controlled by a control plane PIM unit 232. In some embodiments, the control plane PIM unit 232 implements an auto configuration process by which the router 200 learns of the primary IIF 112 associated with particular multicast traffic e.g. via RIB (Routing Information Base) which contains the routing information maintained by the router 200. The control plane PIM unit 232 can also implement a manual configuration process by which the corresponding secondary IIF 114 is configured. In general, the control plane PIM unit 232 ensures the data flow control unit 116 is aware of the primary and secondary IIFs 112, 114 for each group of multicast traffic which traverses the router 200 when part of a ring topology.

In one embodiment, the data flow control unit 116 determines the router 200 is part of a ring topology responsive to a multicast message received on the corresponding primary IIF 112, the multicast message indicating a plurality of incoming interfaces per route. The multicast message is a PIM dual join message received from a neighboring router on the primary IIF 112 according to an embodiment. In another embodiment, the data flow control unit 116 determines whether the router 200 is part of a ring topology responsive to control signaling received from an operator of the network. In each case, the data flow control unit 116 unicasts traffic received on the secondary IIF 114 to the primary IIF 112 when the router 200 is part of a ring topology. Otherwise, multicast traffic arriving on the secondary IIF 114 is dropped at the ingress and not unicast on the primary IIF 112.

Figure 3:
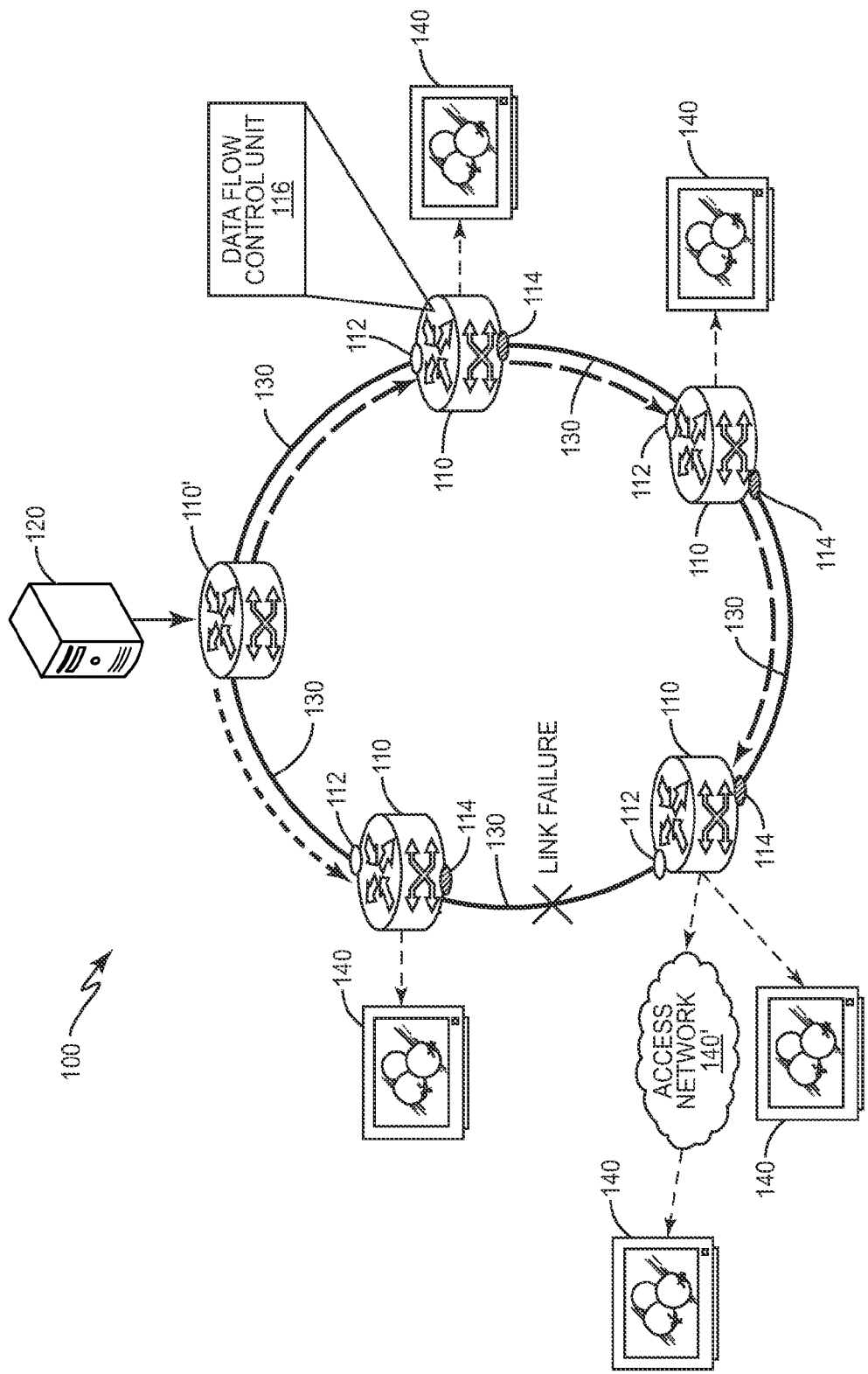
FIG. 3 illustrates the packet-switched network of FIG. 1 with a link failure.

FIG. 3 shows the packet-switched network 100 of FIG. 1 with a link failure between two of the network nodes 110 which form part of a ring topology. The ring connection is temporarily broken because of the link failure. However, hosts 140 which joined a particular multicast group having traffic traversing the network 100 can still access the content because of the traffic management techniques implemented by the data flow control unit 116 of the affected network node 110. In the event a link 130 connected to a network node 110 becomes inoperative as shown in FIG. 3 or of the corresponding primary IIF 112 becomes inoperative, the affected network node 110 detects the event and immediately starts forwarding traffic received on the secondary IIF 114 to hosts 140 and downstream network nodes 110.

Figure 4:
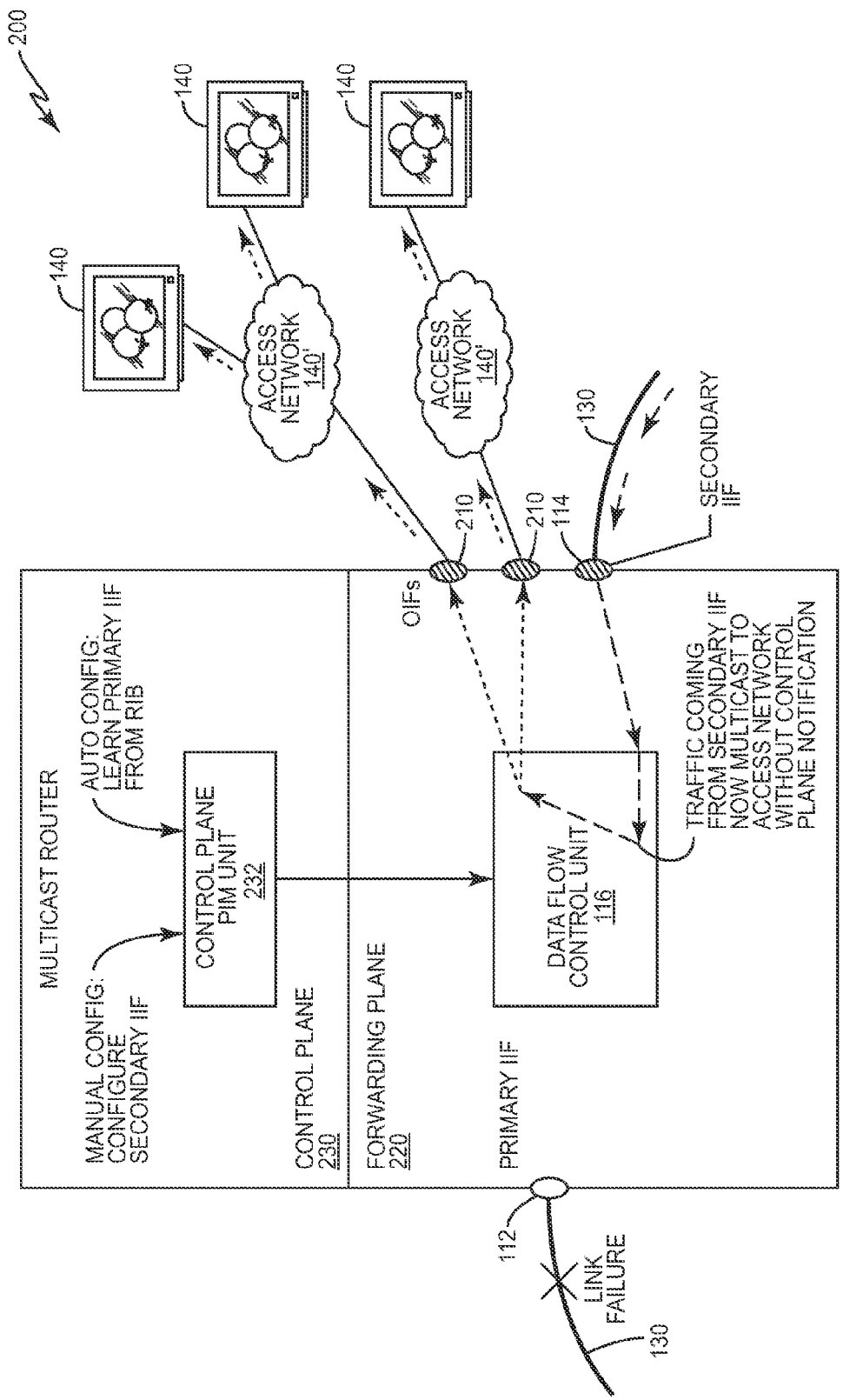
FIG. 4 illustrates operation of the network node shown in FIG. 2 responsive to a link failure.

FIG. 4 shows the operation of the data flow control unit 116 included in a network node 110 affected by an inoperative link 130 or primary IIF 112. In response to detecting the inoperative state, the data flow control unit 116 forwards multicast traffic received on the secondary IIF 114 to the corresponding hosts 140 on one or more outgoing interfaces 210. The data flow control unit 116 can determine a link is inoperative responsive to control plane signaling received at the network node 110 or by detecting a physical link failure on the primary IIF 112. In either case, the data flow control unit 116 may forward the traffic to some or all of the hosts 140 via an access network host 140'. In one embodiment, the data flow control unit 116 multicasts the traffic received on the secondary IIF 114 to each host 140. The data flow control unit 116 can forward the traffic with or without notification from the control plane 230. Instead of a link failure, the primary IIF 112 may instead be inoperative. In either case, the data flow control unit 116 performs the traffic forwarding procedures described above to ensure the hosts 140 receive multicast content despite the network node 110 being part of a ring topology which has an inoperative link 130 or primary IIF 112.

Figure 5:
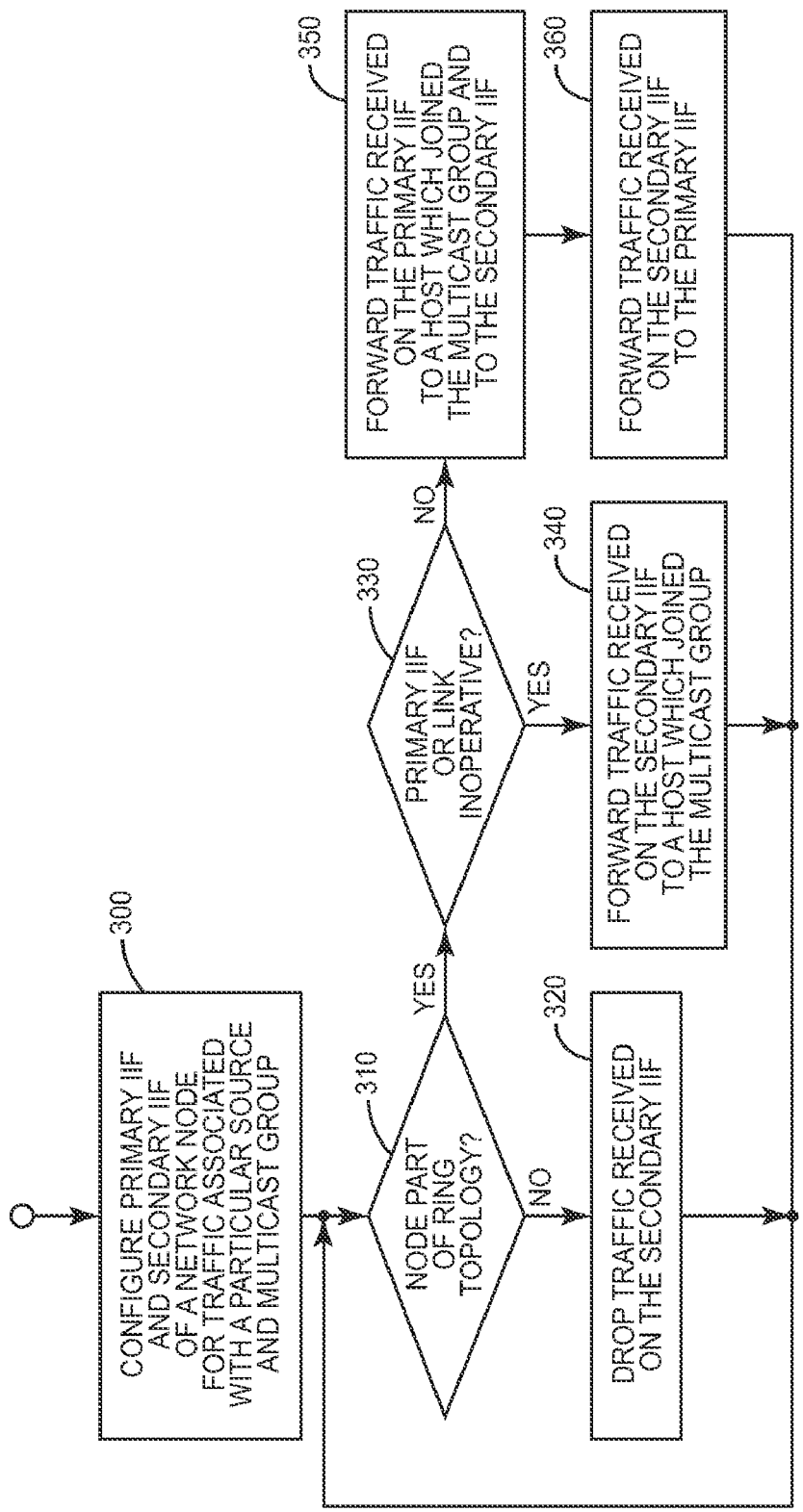
FIG. 5 is a logic flow diagram of a method of operating a network node deployed in a packet-switched network according to an embodiment.

FIG. 5 illustrates an embodiment of a method of operating a network node deployed in a packet-switched network. The method includes configuring a primary IIF and a secondary IIF of a network node for traffic associated with a particular source and multicast group (Step 300) and determining whether the network node is part of a ring topology (Step 310). If not, traffic received on the secondary IIF is dropped (Step 320). If the node is part of a ring topology, the data flow control unit determines whether the primary IIF or a link connected to the primary IIF is inoperative (Step 330). If so, traffic received on the secondary IIF is forwarded to one or more hosts which joined the multicast group e.g. by multicasting the traffic to each host on one or more outgoing interfaces (Step 340). Otherwise, traffic received on the primary IIF associated with the source and multicast group is forwarded to host(s) which joined the multicast group (Step 350) and traffic received on the secondary IIF associated with the same source and multicast group is forwarded to the primary IIF (Step 360). This traffic can be multicast to another network node on the ring topology so that traffic can flow in both directions over each link of the ring-configured network.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A network node for deployment in a packet-switched network, the network node comprising:
    a primary incoming interface operable to receive traffic associated with a particular source and multicast group;
    a secondary incoming interface operable to serve as a backup interface if the primary incoming interface or a transmission path coupled to the primary incoming interface is inoperative; and
    a data flow control unit operable to determine whether the network node is part of a ring topology and if so, forward traffic received on the primary incoming interface associated with the source and multicast group to both a host which joined the multicast group and the secondary incoming interface and forward traffic received on the secondary incoming interface associated with the source and multicast group to the primary incoming interface.

2. The network node of claim 1, wherein the data flow control unit is operable to multicast the traffic received on the primary incoming interface to the host over one or more outgoing interfaces of the network node and to the secondary incoming interface.

3. The network node of claim 1, wherein the data flow control unit is operable to determine the network node is part of a ring topology responsive to a multicast message received on the primary incoming interface, the multicast message indicating a plurality of incoming interfaces per route.

4. The network node of claim 3, wherein the multicast message is a protocol independent multicast dual join message.

5. The network node of claim 1, wherein the data flow control unit is operable to determine whether the network node is part of a ring topology responsive to control signaling received from an operator of the network.

6. The network node of claim 1, wherein the network node is a router.

7. The network node of claim 1, wherein the data flow control unit is further operable to determine if the primary incoming interface or a transmission path coupled to the primary incoming interface is inoperative when the network node is part of a ring topology, and if so forward the traffic received on the secondary incoming interface to the host.

8. The network node of claim 7, wherein the data flow control unit is operable to forward the traffic received on the secondary incoming interface to the host when the primary incoming interface or a transmission path coupled to the primary incoming interface is inoperative and the network node is part of a ring topology by multicasting the traffic received on the secondary incoming interface to the host over one or more outgoing interfaces of the network node.

9. The network node of claim 7, wherein the data flow control unit is operable to forward the traffic received on the secondary incoming interface to the host when the primary incoming interface or a transmission path coupled to the primary incoming interface is inoperative and the network node is part of a ring topology without control plane notification.

10. The network node of claim 7, wherein the data flow control unit is operable to determine if the primary incoming interface or a transmission path coupled to the primary incoming interface is inoperative responsive to control plane signaling received at the network node.

11. The network node of claim 7, wherein the data flow control unit is operable to determine the primary incoming interface or a transmission path coupled to the primary incoming interface is inoperative by detecting a physical link failure on the primary incoming interface.

12. The network node of claim 1, wherein the data flow control unit is further operable to drop the traffic received on the secondary incoming interface when the network node is not part of a ring topology.

13. A method of operating a network node deployed in a packet-switched network, the method comprising:
    receiving traffic associated with a particular source and multicast group on a primary incoming interface of the network node;
    using a secondary incoming interface of the network node as a backup interface if the primary incoming interface or a transmission path coupled to the primary incoming interface is inoperative;
    determining whether the network node is part of a ring topology; and
    if the network node is part of a ring topology, forwarding traffic received on the primary incoming interface associated with the source and multicast group to both a host which joined the multicast group and the secondary incoming interface and forwarding traffic received on the secondary incoming interface associated with the source and multicast group to the primary incoming interface.

14. The method of claim 13, comprising multicasting the traffic received on the primary incoming interface to the host over one or more outgoing interfaces of the network node and to the secondary incoming interface.

15. The method of claim 13, comprising:
    receiving a multicast message on the primary incoming interface, the multicast message indicating a plurality of incoming interfaces per route; and
    determining the network node is part of a ring topology responsive to the primary incoming interface receiving the multicast message.

16. The method of claim 15, wherein the multicast message is a protocol independent multicast dual join message.

17. The method of claim 13, comprising determining whether the network node is part of a ring topology responsive to control signaling received from an operator of the network.

18. The method of claim 13, further comprising determining whether the primary incoming interface or a transmission path coupled to the primary incoming interface is inoperative when the network node is part of a ring topology, and if so forward the traffic received on the secondary incoming interface to the host.

19. The method of claim 18, comprising multicasting the traffic received on the secondary incoming interface to the host over one or more outgoing interfaces of the network node when the primary incoming interface or a transmission path coupled to the primary incoming interface is inoperative and the network node is part of a ring topology.

20. The method of claim 18, comprising forwarding the traffic received on the secondary incoming interface to the host when the primary incoming interface or a transmission path coupled to the primary incoming interface is inoperative and the network node is part of a ring topology without control plane notification.

21. The method of claim 18, comprising determining whether the primary incoming interface or a transmission path coupled to the primary incoming interface is inoperative responsive to control plane signaling received at the network node.

22. The method of claim 18, comprising determining the primary incoming interface or a transmission path coupled to the primary incoming interface is inoperative by detecting a physical link failure on the primary incoming interface.

23. The method of claim 13, further comprising dropping the traffic received on the secondary incoming interface when the network node is not part of a ring topology.

* * * * *